(12) United States Patent
Alfred

(10) Patent No.: US 11,646,432 B2
(45) Date of Patent: May 9, 2023

(54) HYDROGEN AND ELECTRIC GAS STATION

(71) Applicant: ALFRED & D-VARTA LLC, Washington, DC (US)

(72) Inventor: Joseph Walton Alfred, Washington, DC (US)

(73) Assignee: Alfred & D-Varta LLC, Washington, DC (US)

( * ) Notice: Subject to any disclaimer, the term of this patent is extended or adjusted under 35 U.S.C. 154(b) by 255 days.

(21) Appl. No.: 17/112,562

(22) Filed: Dec. 4, 2020

(65) Prior Publication Data

US 2021/0175529 A1 Jun. 10, 2021

Related U.S. Application Data

(60) Provisional application No. 62/944,152, filed on Dec. 5, 2019.

(51) Int. Cl.

| | |
|---|---|
| *H01M 8/065* | (2016.01) |
| *H01M 8/04082* | (2016.01) |
| *F22B 1/00* | (2006.01) |
| *F24V 30/00* | (2018.01) |
| *F01K 21/00* | (2006.01) |
| *H02K 7/18* | (2006.01) |
| *H02S 10/10* | (2014.01) |
| *B60L 53/51* | (2019.01) |
| *B60L 53/54* | (2019.01) |

(Continued)

(52) U.S. Cl.
CPC ............ *H01M 8/065* (2013.01); *B60L 53/51* (2019.02); *B60L 53/54* (2019.02); *F01D 15/10* (2013.01); *F01K 21/00* (2013.01); *F22B 1/00* (2013.01); *F24V 30/00* (2018.05); *H01M 8/04201* (2013.01); *H02K 7/1823* (2013.01); *H02S 10/10* (2014.12); *H02J 7/35* (2013.01)

(58) Field of Classification Search
CPC ... H01M 8/065; H01M 8/04201; B60L 53/51; B60L 53/54; F22B 1/00; F24V 30/00; H02S 10/10; H02K 7/1823; H02J 7/35
See application file for complete search history.

(56) References Cited

U.S. PATENT DOCUMENTS

| | | |
|---|---|---|
| 5,001,167 A | 3/1991 | Wiltz, Jr. et al. |
| 7,331,312 B2 | 2/2008 | Choi |
| 2009/0252671 A1 | 10/2009 | Fullerton |

(Continued)

FOREIGN PATENT DOCUMENTS

WO 2018222569 A1 12/2018

OTHER PUBLICATIONS

Petrovic et al., J., "Reaction of Aluminum with Water to Produce Hydrogen," U.S. Department of Energy, Version 1.0, pp. 1-26, 2008, Washington, D.C.

(Continued)

*Primary Examiner* — Adam A Arciero
(74) *Attorney, Agent, or Firm* — Hauptman Ham, LLP

(57) ABSTRACT

An apparatus including a boiler configured to receive water, sodium hydroxide, and aluminum. A generator adjacent to the boiler and configured to generate electricity based on heat received from the boiler. A hydrogen capture system coupled with the boiler and configured to capture hydrogen from the boiler. A fuel cell communicatively coupled with the hydrogen capture system and configured to receive at least a portion of the hydrogen from the hydrogen capture system to generate electricity. A transformer electrically coupled with the generator and the fuel cell.

20 Claims, 4 Drawing Sheets

(51) Int. Cl.
 *F01D 15/10* (2006.01)
 *H02J 7/35* (2006.01)

(56) References Cited

U.S. PATENT DOCUMENTS

2011/0132424 A1   6/2011   Rakib
2016/0040928 A1   2/2016   Rasmussen et al.
2017/0104426 A1   4/2017   Mills
2017/0327091 A1   11/2017  Capizzo

OTHER PUBLICATIONS

Milani et al., M., "Electrical Power and Hydrogen Production From Aluminum / Water Combustion," HYdraulic SYstems DEsign Research Group, DISMI, Department of Engineering Sciences & Methods, University of Modena & Reggio Emilia, pp. 1-29, Italy.
International Search Report and Written Opinion issued in corresponding International Application No. PCT/US20/63374, dated Feb. 24, 2021, U.S. Patent and Trademark Office, Alexandria, Virginia.

HYDROGEN AND ELECTRIC GAS STATION

PRIORITY CLAIM

The present application claims the priority of U.S. Provisional Application No. 62/944,152, filed Dec. 5, 2019, which is incorporated herein by reference in its entirety.

BACKGROUND

As humanity has become increasingly aware of the effects we inflict on the environment, we have increasingly poured our efforts into the development of clean, sustainable energy. One such energy is that derived from hydrogen, but traditional methods of generating, transporting, and dispensing hydrogen tend to be inefficient, unsafe, and/or unaffordable. A method of generating hydrogen that can then be safely and affordably dispensed to a consumer would present an array of new possible solutions to problems faced in many fields of energy technology.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
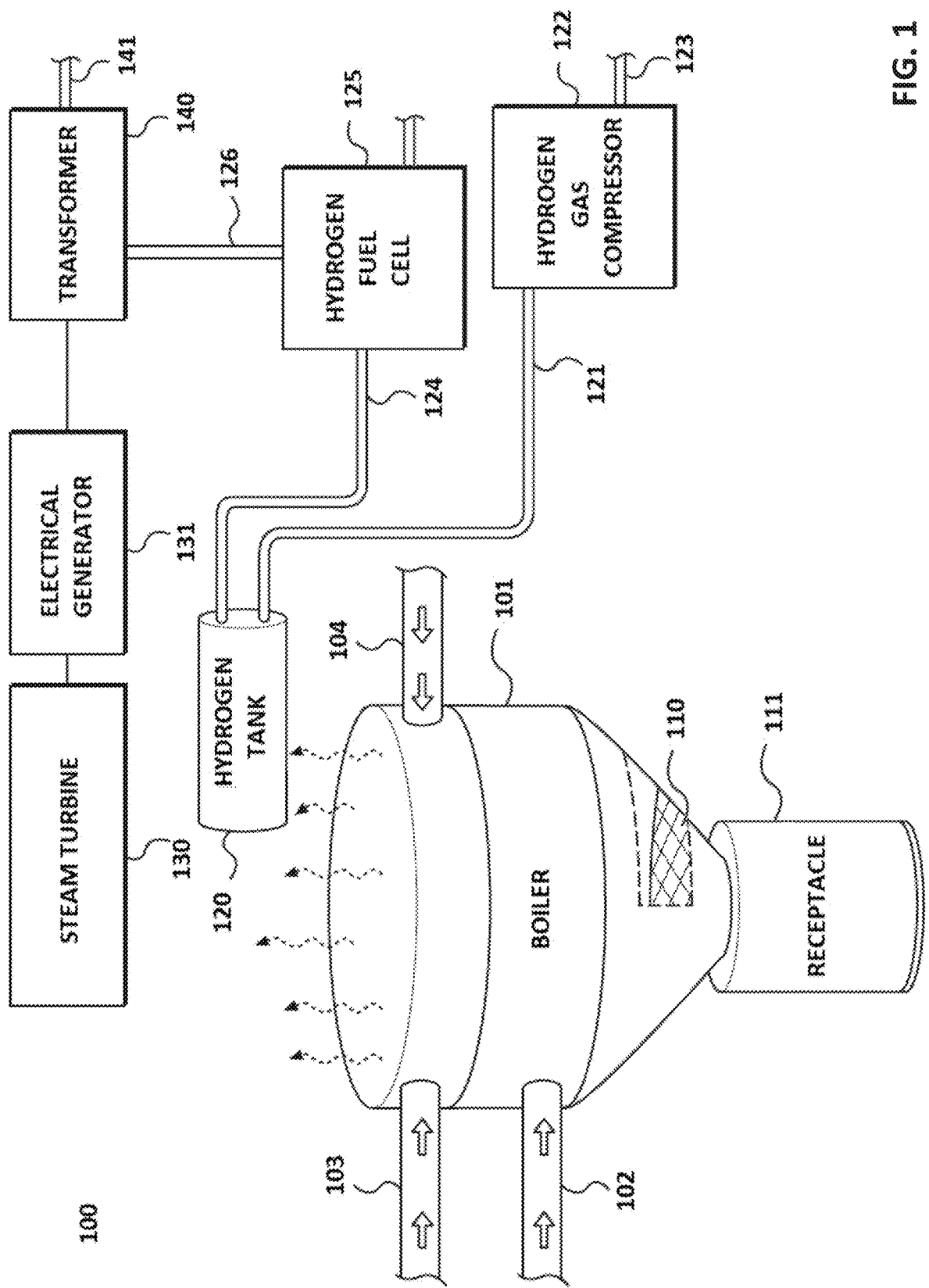
FIG. 1 is a functional block diagram of a hydrogen and electric power station, in accordance with an embodiment.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Hydrogen Generation that can Safely and Affordably be Dispensed to the Consumer.

Other approaches which have similar processes and utilize the same elemental materials of aluminum and water waste electrical energy to activate the chemical reaction. The other approaches also do not take electrical vehicle charging into account and are only meant for hydrogen fuel cell vehicles.

By relying solely on the chemical reaction, one or more embodiments of the power station of the present disclosure induces the key components of the reaction: heat, hydrogen, and sodium aluminate NaAl(OH)4 without sacrificing electrical energy. These power stations also take into account currently available technology to allow for hydride refueling at up to 200 pounds per square inch (psi).

As stated above, other approaches have difficulty generating hydrogen that can safely and affordably be dispensed to the consumer. One or more of the present embodiments solves this problem.

Unlike other systems and processes for generating, transporting, and dispensing hydrogen, one or more of the disclosed embodiments creates the fuel at the point of sale while also producing electrical energy usable to charge electric vehicles among other uses.

The claimed embodiment differs from and is better than other approaches. One or more of the embodiments is different from currently existing technology, as this embodiment provides energy for zero emission vehicles fueled by either hydrogen or electricity, either separately or simultaneously. Additionally, this embodiment provides hydride fueling options for consumers with vehicles that require fueling at a lower psi, compared to the current industry standard of 8,000 psi.

These other devices and systems do not work well because they typically require that the aluminum be continuously ground in order to activate a reaction. The amount of mechanical and electrical energy required to break the aluminum oxide layer dramatically reduces the net amount of electricity that can be generated for distribution to either the grid or electric battery vehicles. This significantly decreases the ability of the system to charge multiple electric vehicles alongside hydrogen fuel cell vehicles.

By relying solely on the chemical reaction, one or more of the presently disclosed embodiments induces the key components of the reaction: heat, hydrogen, and sodium aluminate NaAl(OH)4 without sacrificing electrical energy.

Also, one or more of the presently disclosed embodiments is capable of producing Hydrogen, electricity, and/or sodium aluminate.

DESCRIPTION OF THE FIGURES

FIG. 1 is a functional block diagram of a hydrogen and electric power station 100, in accordance with an embodiment. A boiler 101, which has an interior coated with a layer of polyurethane, has three inlets. A first inlet 102 is configured for attachment to a water supply. A second inlet 103 is configured for a supply of sodium hydroxide. A third inlet 104 is configured for a supply of aluminum. Boiler 101 is a cylindrical body having a frusto-conical bottom portion. In some embodiments, boiler 101 is a different shape, e.g., tapered cylinder, conical, or the like.

The boiler 101 is attached to a receptacle 111 for receiving solid sodium aluminate from the boiler. Inside the boiler 101, a sieve 110 is between boiler 100 and receptacle 111, and may be sealed to separate receptacle 111 from the boiler 100.

A hydrogen tank 120 and a steam turbine 130 are above boiler 101. There is a hole at the top of the boiler 101, which fluidly connects with the hydrogen tank 120. This hole allows the hydrogen tank 120 to capture the rising hydrogen gas generated by operation of boiler 101. Steam turbine 130 is configured to capture heat generated by operation of boiler 101. A gas line 121 connects the hydrogen tank 120 to a hydrogen gas compressor 122. A gas line 123 connects hydrogen gas compressor 122 to a fueling station 200 (shown in FIG. 2). A gas line 124 connects hydrogen tank 120 to a hydrogen fuel cell 125. A conducting line 126 electrically connects hydrogen fuel cell 125 to a transformer 140.

Figure 2:
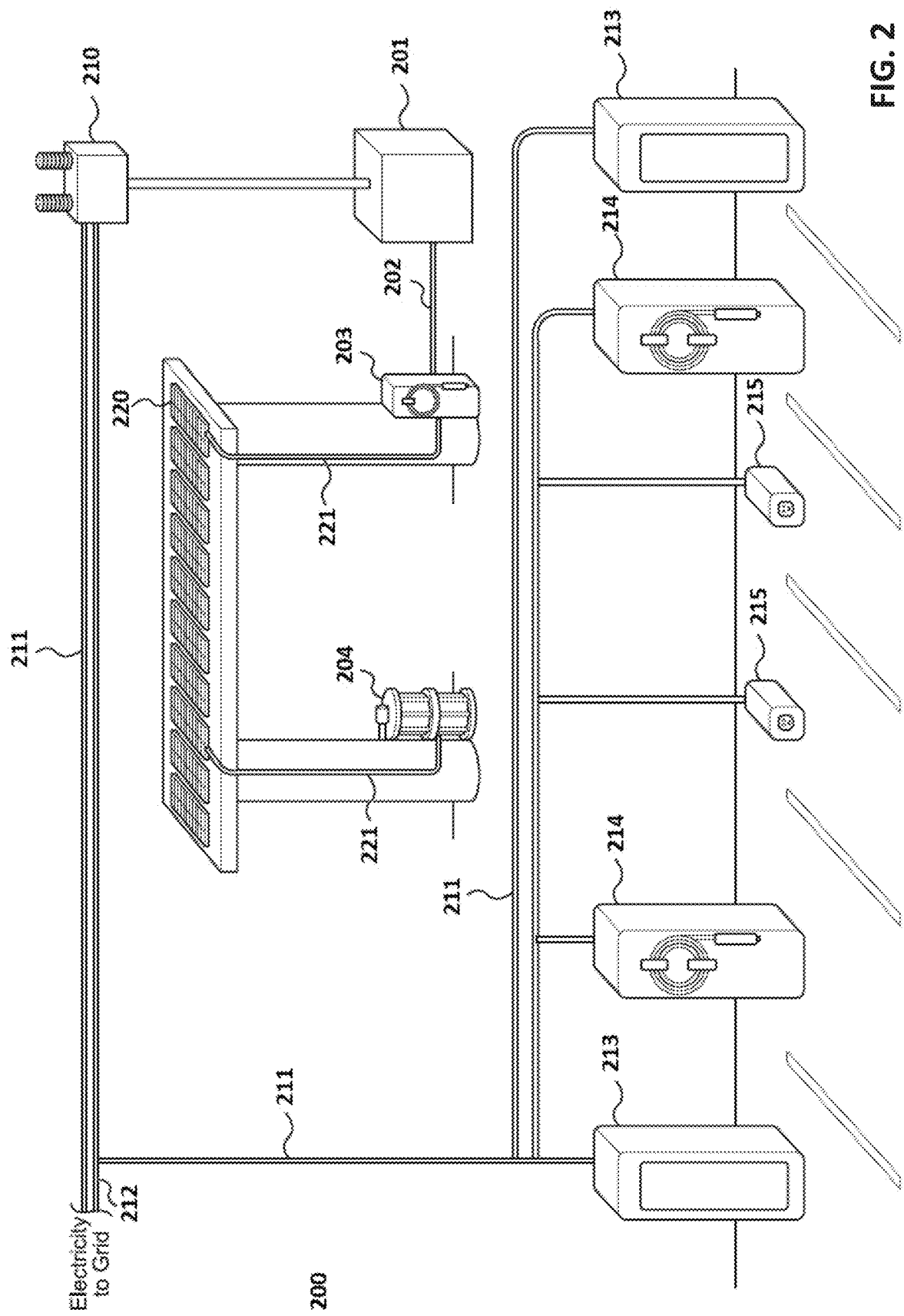
FIG. 2 is a diagram of a fueling station, in accordance with an embodiment.

The steam turbine 130 is connected to an electrical generator 131. The electrical generator 131 is also electrically connected to the transformer 140. Another electrical line 141 connects transformer 140 to the fueling station (FIG. 2). In FIG. 2, transformer 140 is depicted as transformer 210 and electrical line 141 is depicted as electrical line 211.

FIG. 2 is a functional block diagram of a hydrogen and electric vehicle fueling station 200, in accordance with an embodiment. A gas line 202 connects hydrogen gas compressor 201 to an 8000 PSI hydride fueling station 203 and a 200 PSI station electrolyzer 204.

Electrical line 211 connects a transformer 210 to a 480 Volt charger station 213, a 240 Volt charger station 214, and a 120 Volt charger station 215. Offshoot electrical line 212 connects to the electrical grid.

Electrical line 221 connects a solar panel system 220 to the rest of the system.

Figure 3:
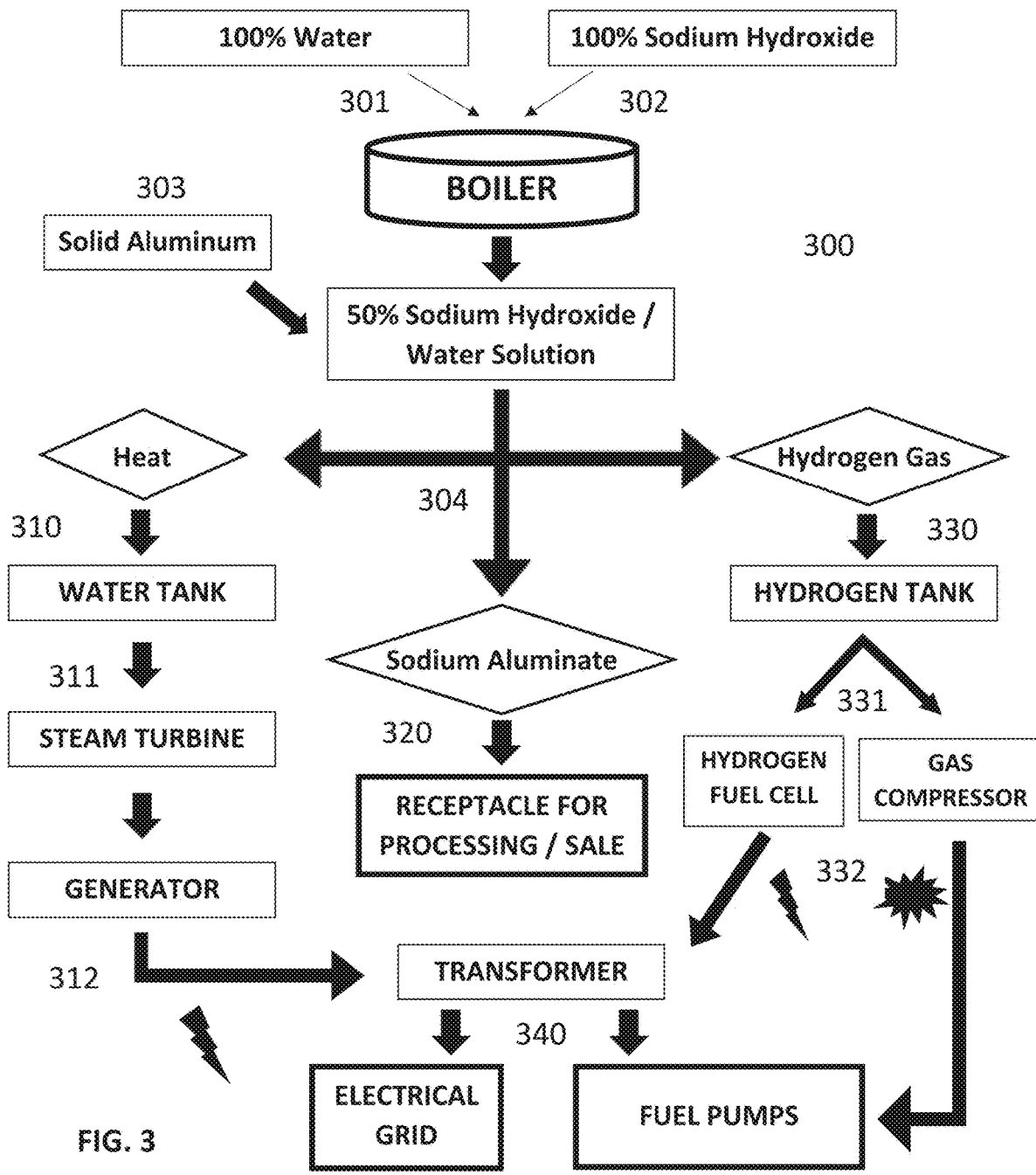
FIG. 3 is a flowchart of a method of operating a power station, in accordance with an embodiment.

FIG. 3 is a method flowchart 300 of a method of operating a power station, in accordance with an embodiment. In the first step 301, water is added to a boiler, e.g., boiler 101 (FIG. 1). In the next step 302, sodium hydroxide is added to the same boiler to achieve a 50% sodium hydroxide/water solution. In step 303, solid aluminum is added to the solution created in step 302. A chemical reaction 304 occurs, generating heat, sodium aluminate, and hydrogen gas as products. These products are used in steps 4A 310, 4B 320, and 4C 330, which may occur simultaneously or separately.

In step 4A-1 311, the generated heat boils the water in an adjacent water tank to release steam, which generates electricity through a steam turbine and generator. In step 4A-2 312, the electricity from the generator is sent to a transformer.

In step 4B 320, the sodium aluminate is collected in a receptacle and processed for sale or use.

In step 4C-1 330, the hydrogen gas is captured in an adjacent hydrogen tank. In step 4C-2 331, the hydrogen gas is further processed into electricity via a hydrogen fuel cell or compressed in a gas compressor as needed. In step 4C-3 332, the electricity from the hydrogen fuel cell is delivered to a transformer, and the compressed gas is delivered to hydrogen fuel pumps.

In step 4D 340, the electricity delivered to the transformer is distributed to either the electrical grid or appropriate fuel pumps.

Figure 4:
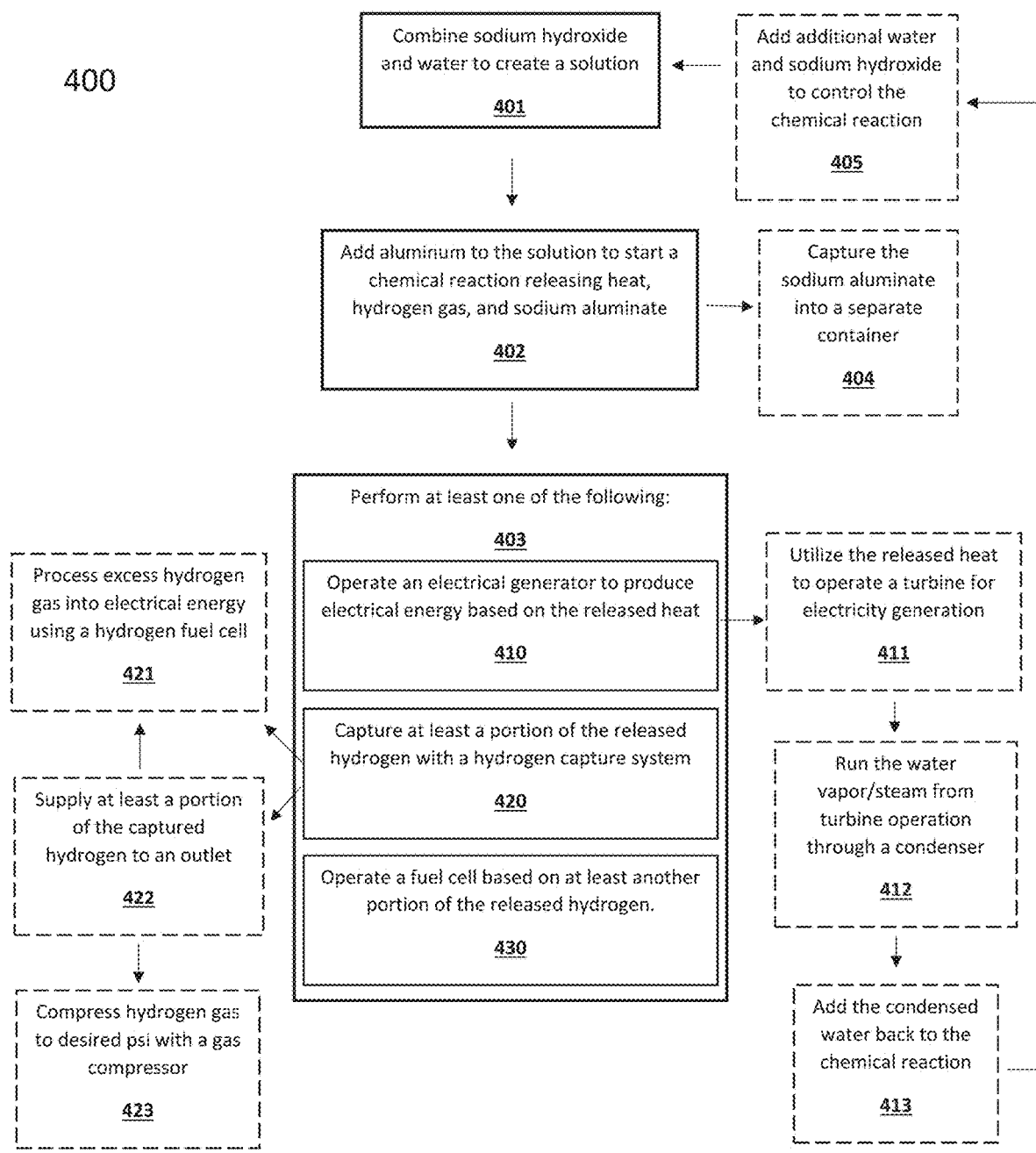
FIG. 4 is another flowchart of a method of operating a power station, in accordance with an embodiment.

FIG. 4 is a flowchart 400 of a method of operating a power station, in accordance with an embodiment. In the first operation 401, sodium hydroxide and water are combined to form a solution in a boiler, e.g., boiler 101 (FIG. 1). In the next operation 402, solid aluminum is added to the solution to start a chemical reaction releasing heat, hydrogen gas, and sodium aluminate. In the next operation 403, at least one of the following operations are performed:

1. Operate an electrical generator to produce electrical energy based on the released heat in operation 410;
2. Capture at least a portion of the released hydrogen with a hydrogen capture system in operation 420; or
3. Operate a fuel cell based on at least another portion of the released hydrogen in operation 430.

In at least some embodiments, all of the operations are performed. In at least some embodiments, at least two of the operations are performed.

Depending on the embodiment, the released heat may be used to produce electrical energy through the use of a steam turbine in operation 411. If a steam turbine is used, the water vapor/steam may be condensed back into liquid water in operation 412 and may be added back to the chemical reaction as desired in operation 413.

After capturing a portion of the hydrogen gas 420, the excess hydrogen gas may be processed into electrical energy using a fuel cell in operation 421, and/or supplied to an outlet in operation 422. If a portion of the captured hydrogen is supplied to an outlet in operation 422, the hydrogen may still be processed into electrical energy 4 in operation 21, or it may be compressed to a desired psi with a gas compressor in operation 423.

Depending on the embodiment, the user may capture the sodium aluminate into a separate container in operation 404 and add additional water and sodium hydroxide as needed to control the chemical reaction in operation 405.

How an Embodiment Works:

At the start of the reaction, a polyurethane-lined boiler 101 is used in order to contain the reaction and the polyurethane is used to eliminate or reduce deterioration of the boiler during the reaction. The boiler 101 may be any shape where the bottommost portion narrows to facilitate the collection of sediments/precipitates. For example, the boiler 101 may be a 3,200 gallon container with a size of 9' (nine feet tall) by 8'5" (eight and one half feet wide). The size of the boiler 101 may be expanded or reduced as desired to control the quantity of reaction products, and the number of boilers 101 used may be increased or decreased depending on the embodiment. The polyurethane-lined boiler 101 is filled no more than halfway with 100% liquid water through the water inlet 102. 100% sodium hydroxide is then added to the water through an inlet 103 until a 50% sodium hydroxide/water solution is achieved. These inlets may be controlled manually or automatically via a processor (not depicted in figures). After this composition is attained, solid aluminum is added to the solution through a separate inlet 104. The addition of the solid aluminum starts a chemical reaction which produces heat, hydrogen gas, and solid sodium aluminate.

The hydrogen gas produced by the reaction is captured by a hydrogen gas tank 120 which is positioned above the boiler. The hydrogen tank 120 includes gas lines 121, 124 leading to a gas compressor 122, 201 and a hydrogen fuel cell 125. The gas compressor 122, 201 compresses the hydrogen to the desired psi, and delivers the gas to hydride fuel pumps 203, 204 (In this embodiment, the gas compressor should be able to compress gas to a range of 5,000 to 10,000 psi, in order to meet industry standards for various vehicles such as trucks and passenger vehicles). The hydrogen fuel cell 125 processes excess hydrogen from the tank into electrical energy, which is then regulated by a transformer 140, 210. This electrical energy may be used to power the fueling station 200 as needed, stored in a battery system, sold to the electrical grid, or some other use depending on the embodiment.

The heat released by the chemical reaction flows upward towards the top of the boiler 101, where it is transferred to a piping system above the boiler 101 via the galvanized steel of the boiler 101 (Piping system not depicted in figure). The flowing water inside the piping system is heated up and converted into steam to power the steam turbine 130 (for example, 500-Megawatt Siemens brand utility steam turbines, industrial steam turbines, or Dresser-Rand steam turbines) placed above the boiler 101. The steam turbine 130 powers an adjacent electrical generator 131 to produce electrical energy, which is then regulated by a transformer 140, 210 (In this embodiment, the turbine, generator, and transformer system should be able to handle/generate electricity in the range of 10 KW to 2000 MW, as the heat generated from the chemical reaction will increase at a rate of 18 Megajoules/1 kg aluminum). This electrical energy may be used to power the fueling station 200 as needed, stored in a battery system, sold to the electrical grid, or some other use depending on the embodiment.

The solid sodium aluminate produced by the chemical reaction sinks to the bottom of the boiler 101, where the solid sodium aluminate falls through a sieve 110 into a removable receptacle 111 attached to the bottom of the boiler 101. When the receptacle 111 has been filled to a desired volume of solid sodium aluminate, the sieve 110 can be sealed to separate the boiler 101 from the receptacle 111. The receptacle 111 may then be removed, and a fresh receptacle 111 inserted in its place. Once the new receptacle 111 is in place, the sieve 110 may be reopened to allow for the continued collection of solid sodium aluminate. The collected sodium aluminate may then be processed and sold as desired. As the sodium aluminate will initially still be in the water, it may be sold as a solution at various strengths (e.g., 38%, 43%, 45%, or the like) depending on the embodiment, or dried out in a separate process and sold as a solid.

The reaction may be restarted or continued by refilling the boiler with the starting materials through the various inlets 102, 103, 104 as needed.

In the fueling station portion of this embodiment 200, the electrical energy may be used to power charging stations 213, 214, 215 of various voltages (for example, 120 V, 240 V, and 480 V stations). The compressed hydrogen gas may be used in fueling pumps 203 for hydrogen fuel cell vehicles. The station may also include an electrolyzer 204 for vehicles which require hydride fueling pumps with a lower PSI requirement (for example, 200 PSI vehicles). In some embodiments, a solar panel system 220 may be included to power the electrolyzer 204 or other aspects of the station 200.

How to Make an Embodiment:

A person can make this embodiment by either converting an existing gas station into a hydrogen and electric gas station 200 or begin building on an empty piece of land in the appropriate zoning district.

The boiler 101, steam turbine 130, electrical generator 131, transformer 140, 210, electrical charging stations 213, 214, 215, hydrogen gas tank 120, hydrogen fuel cell 125, electrolyzer 204, sealing storage receptacle 111, sodium hydroxide inlet 103, aluminum inlet 104, water inlet 102, and sodium hydroxide staging container (Not depicted in figure, connected to sodium hydroxide inlet 103) are all elements usable in connection with one or more embodiments.

The solar panels 220 on the roof generating the power for the electrolyzer 204 is optional. In at least one embodiment, the solar panels are used in the hydride filling process (HyTech Power LLC).

The hydrogen within the hydrogen tank 120 is also usable to burn hydrogen gas to boil the water within the steam turbine 130. The resulting water vapor (H2O) could be run through a condenser to make liquid water again to be distributed into the steam turbine 130 or the polyurethane boiler 101.

How to Use the Embodiment:

A person would fill up the boiler 101 within the station with aluminum and sodium hydroxide solution. They would turn on the steam turbine 130, electrical generator 131, transformer 140, 210, electrolyzer 204, and fuel cell 125 systems to generate electricity, hydrogen, and sodium aluminate, and run the system 100, 200 continuously to maximize profit.

Additionally: other embodiments of this invention include but are not limited to applications such as producing electricity, hydrogen gas, electricity, and/or sodium aluminate.

In one embodiment, the apparatus comprises a boiler configured to receive water, sodium hydroxide, and aluminum through various inlets. The apparatus may also include a receptacle connected with the boiler and configured to receive sodium aluminate. A generator adjacent to the boiler is configured to receive heat from the boiler, and uses the heat to operate a turbine connected to the generator to produce electricity. A hydrogen capture system is coupled with the boiler, and is configured to capture released hydrogen. A fuel cell is communicatively coupled with the hydrogen capture system, and is configured to receive at least apportion of the hydrogen from the hydrogen capture system to generate electricity. The generator and fuel cell are electrically coupled with a transformer, which is configured to supply a voltage to a similarly coupled electrical charging station.

The electrical charging station includes outlets which can produce one or more of 120 volts, 240 volts, and 480 volts. The electrical charging station may also be electrically coupled with one or more solar panels. The electrical charging station may also include at least one hydride fuel pump which allows for hydride refueling, and an electrolyzer system to fill the hydride fuel pump. The apparatus may be used to generate hydrogen gas and electrical energy according to various method embodiments. In one such embodiment, sodium hydroxide and water are combined to create a solution. Aluminum is then added to the solution to start a chemical reaction which releases heat, hydrogen gas, and sodium aluminate. Next, the user performs at least one of the following steps: 1. Operating an electrical generator to produce electrical energy based on the released heat; 2. Capturing at least a portion of the released hydrogen with a hydrogen capture system; or 3. Operating a fuel cell based on at least another portion of the released hydrogen.

In some embodiments, the electrical generator may be operated via a turbine, which is in turn operated based on the released heat, and in some embodiments water vapor/steam from the turbine operation may be run through a condenser. This condensed water may be added back to the chemical reaction in some embodiments as needed.

In some embodiments, at least another portion of the hydrogen from the hydrogen capture system is supplied to an outlet, and in some embodiments the hydrogen from the hydrogen capture system or the released hydrogen may be compressed in a hydrogen gas compressor and processed into electrical energy via a hydrogen fuel cell. Depending on the embodiment, the gas may be compressed to different pressures, for example 200 psi for certain hydride fueled vehicles.

In some embodiments, the sodium aluminate may be captured into a separate container. In some embodiments, additional water and/or sodium hydroxide may be added as needed to control the reaction. The aspects of the different possible embodiments may be practiced jointly or separately depending on the needs of the user.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. An apparatus comprising:
    a boiler configured to receive water, sodium hydroxide, and aluminum;
    a generator adjacent to the boiler and configured to generate electricity based on heat received from the boiler;
    a hydrogen capture system coupled with the boiler and configured to capture hydrogen from the boiler;
    a fuel cell communicatively coupled with the hydrogen capture system and configured to receive at least a portion of the hydrogen from the hydrogen capture system to generate electricity;
    a transformer electrically coupled with the generator and the fuel cell;
    a receptacle detachably attached to the boiler; and
    a sealable sieve located between the boiler and the receptacle.

2. The apparatus of claim 1, wherein the boiler has an interior coating of polyurethane.

3. The apparatus of claim 1, wherein the boiler comprises an inlet for receiving water.

4. The apparatus of claim 1, wherein the boiler comprises an inlet for receiving aluminum.

5. The apparatus of claim 1, wherein the boiler comprises an inlet for receiving sodium hydroxide.

6. The apparatus of claim 1, further comprising a turbine connected with the generator and configured to operate based on heat received from the boiler.

7. The apparatus of claim 1, wherein the transformer is electrically coupled with a grid to allow for both distributing and absorbing zero emission electricity and the transformer is configured to supply a voltage to an electrical charging station.

8. The apparatus of claim 1, further comprising an electrical charging station electrically coupled with the transformer and wherein the charging station supplies one or more of 120, 240, and 480 volts.

9. The apparatus of claim 8, further comprising at least one solar panel electrically coupled with the electrical charging station.

10. The apparatus of claim 1, wherein the receptacle connected with the boiler is configured to receive sodium aluminate.

11. The apparatus of claim 1, further comprising:
    at least one hydride fuel pump connected with the electrical charging station to allow for hydride refueling; and
    an electrolyzer system connected with the electrical charging station to fill the hydride fuel pump.

12. A method of generating hydrogen gas and electrical energy comprising:
    combining sodium hydroxide and water to create a solution;
    adding aluminum to the solution in an apparatus according to claim 1 to start a chemical reaction releasing heat, hydrogen gas, and sodium aluminate; and
    performing at least one of:
        operating the generator to produce electrical energy based on the released heat;
        capturing at least a portion of the released hydrogen with the hydrogen capture system; or
        operating the fuel cell based on at least another portion of the released hydrogen.

13. The method of claim 12, further comprising supplying at least another portion of the hydrogen from the hydrogen capture system to an outlet.

14. The method of claim 12, further comprising capturing the sodium aluminate into a separate container.

15. The method of claim 12, further comprising adding water and sodium hydroxide to control the chemical reaction.

16. The method of claim 12, wherein the electrical generator is operated based on operation of a turbine operating based on the released heat.

17. The method of claim 16, further comprising running water vapor/steam from the turbine operation through a condenser.

18. The method of claim 17, further comprising adding the condensed water to the chemical reaction.

19. The method of claim 12, further comprising:
    using a hydrogen gas compressor to compress the captured hydrogen gas; and
    using a hydrogen fuel cell to process excess hydrogen from the hydrogen tank into electrical energy.

20. The method of claim 12, wherein the hydrogen gas is compressed to approximately 200 psi.

* * * * *